United States Patent
Hirao et al.

(10) Patent No.: US 10,450,198 B2
(45) Date of Patent: Oct. 22, 2019

(54) METHOD FOR PRODUCING CONDUCTIVE MAYENITE TYPE COMPOUND

(71) Applicants: Kyoto University, Kyoto-shi (JP); Hitachi Zosen Corporation, Osaka-shi (JP)

(72) Inventors: Kazuyuki Hirao, Kyoto (JP); Heidy Visbal, Kyoto (JP); Takeko Matsumura, Sorakugun (JP); Susumu Hikazudani, Osaka (JP); Satoshi Yoshida, Osaka (JP); Emi Shono, Osaka (JP)

(73) Assignees: Kyoto University, Kyoto-shi (JP); Hitachi Zosen Corporation, Osaka-shi (JP)

( * ) Notice: Subject to any disclaimer, the term of this patent is extended or adjusted under 35 U.S.C. 154(b) by 0 days.

(21) Appl. No.: 15/739,331

(22) PCT Filed: Jun. 21, 2016

(86) PCT No.: PCT/JP2016/068345
§ 371 (c)(1),
(2) Date: Dec. 22, 2017

(87) PCT Pub. No.: WO2016/208563
PCT Pub. Date: Dec. 29, 2016

(65) Prior Publication Data
US 2018/0186650 A1 Jul. 5, 2018

(30) Foreign Application Priority Data
Jun. 25, 2015 (JP) .................................. 2015-127325

(51) Int. Cl.
*C01F 7/16* (2006.01)
*C04B 35/44* (2006.01)
(Continued)

(52) U.S. Cl.
CPC ............. *C01F 7/164* (2013.01); *B01J 19/126* (2013.01); *C04B 35/44* (2013.01);
(Continued)

(58) Field of Classification Search
CPC ........ C01F 7/164; B01J 19/124; C04B 35/44; C04B 35/62645; H01B 1/00; H01M 8/00
See application file for complete search history.

(56) References Cited

U.S. PATENT DOCUMENTS

2008/0095688 A1   4/2008   Hosono et al.

FOREIGN PATENT DOCUMENTS

| CN | 101184697 A | 5/2008 |
|----|---|---|
| EP | 1445237 A1 | 8/2004 |

(Continued)

OTHER PUBLICATIONS

International Search Report dated Aug. 16, 2016, issued for PCT/JP2016/068345.
(Continued)

*Primary Examiner* — James A Fiorito
(74) *Attorney, Agent, or Firm* — Locke Lord LLP; James E. Armstrong, IV; Nicholas J. DiCeglie, Jr.

(57) ABSTRACT

An object of the present invention is to provide a method for producing conductive mayenite, with which a reaction is completed in a short time, an operation can be simplified, the reaction is easily controlled, and the cost of energy can be reduced. The present invention is a method for producing conductive mayenite, characterized by mixing a mayenite type compound with a carbon component, placing the resulting mixture in an airtight container, and irradiating the mixture with a microwave in an inert gas atmosphere or in a vacuum atmosphere to heat the mixture.

16 Claims, 5 Drawing Sheets

(51) Int. Cl.
C04B 35/626 (2006.01)
H01B 1/08 (2006.01)
B01J 19/12 (2006.01)
H01M 8/1246 (2016.01)
H01M 8/04082 (2016.01)

(52) U.S. Cl.
CPC ......... *C04B 35/62645* (2013.01); *H01B 1/08* (2013.01); *H01M 8/04216* (2013.01); *H01M 8/1246* (2013.01); *B01J 2219/0879* (2013.01); *C01P 2002/72* (2013.01); *C01P 2002/74* (2013.01); *C01P 2002/82* (2013.01); *C01P 2002/86* (2013.01); *C01P 2006/40* (2013.01); *C04B 2235/422* (2013.01); *C04B 2235/424* (2013.01); *C04B 2235/425* (2013.01); *C04B 2235/5244* (2013.01); *C04B 2235/652* (2013.01); *C04B 2235/658* (2013.01); *C04B 2235/6567* (2013.01); *C04B 2235/6581* (2013.01); *C04B 2235/667* (2013.01); *H01M 2300/0071* (2013.01)

(56) References Cited

FOREIGN PATENT DOCUMENTS

| | | |
|---|---|---|
| EP | 2351708 A1 | 8/2011 |
| EP | 2708521 A1 | 3/2014 |
| EP | 2832696 A1 | 2/2015 |
| EP | 2947046 A1 | 11/2015 |
| JP | 2003-128415 A | 5/2003 |
| JP | 2006-327894 A | 12/2006 |
| JP | 2010-132467 A | 6/2010 |
| JP | 2013-203588 A | 10/2013 |
| JP | 5347345 B2 | 11/2013 |
| JP | 2014-136661 A | 7/2014 |
| JP | 2018016500 A | 2/2018 |
| WO | 2016/136235 A1 | 9/2016 |

OTHER PUBLICATIONS

Notification of the First Office Action issued in corresponding Chinese Patent Application No. CN 201680031266.X, dated Jan. 3, 2019.
Extended European Search Report issued in correspoding European Patent Application No. EP 16814333.7, dated Jan. 18, 2019.
M. Guangyao et al., "Preface Studies on Material Chemistry," University of Science and Technology of China Press. 1st edition, pp. 299-300.

METHOD FOR PRODUCING CONDUCTIVE MAYENITE TYPE COMPOUND

TECHNICAL FIELD

The present invention relates to a method for producing a conductive mayenite type compound. The conductive mayenite type compound is favorably used as a ceramic exhibiting electrical conductivity in the technical field of a fuel cell material, a hydrogen storage container material, a sensor, an electronic device, an ion emitter, etc.

BACKGROUND ART

A mayenite type compound is a compound derived from a cement mineral produced in Mayen in Germany and is an oxide ion clathrate aluminosilicate having a representative crystal skeleton of $12CaO.7Al_2O_3$ (hereinafter, sometimes denoted by "C12A7").

With respect to conductive mayenite, PTL 1 describes a method for producing conductive mayenite by treating a mayenite type compound with a plasma generated from a rare gas.

Further, PTL 2 describes that conductive mayenite $(Ca_{24}Al_{28}O_{64}{}^{4+}.4e^-)$ is produced by irradiating hydrogen-substituted mayenite $(Ca_{24}Al_{28}O_{64}{}^{4+}.4H^-)$ obtained by substituting free oxygen of mayenite $(Ca_{24}Al_{28}O_{64}{}^{4+}.2O^{2-})$ with hydrogen with ultraviolet light.

CITATION LIST

Patent Literature

PTL 1: Japanese Patent No. 5347345
PTL 2: JP-A-2014-136661

SUMMARY OF THE INVENTION

Technical Problem

However, in the method of PTL 1, it is necessary to treat a mayenite type compound in vacuum after irradiating a rare gas with a microwave to generate a plasma, and therefore, the method has a problem that the reaction takes a long time, the operation is complicated, and it is difficult to control the reaction.

Further, in the method of PTL 2, in order to obtain hydrogen-substituted mayenite $(Ca_{24}Al_{28}O_{64}{}^{4+}.4H^-)$, it is necessary to perform a calcining treatment of katoite at 500 to 1500° C. in a hydrogen atmosphere for about 2 hours, and in order to produce conductive mayenite, it is necessary to further perform an ultraviolet irradiation treatment for about 1 hour, and the method has a problem that the cost of energy goes high, and also the operation is complicated.

In view of the above-mentioned problems of the prior art, an object of the present invention is to provide a method for producing a conductive mayenite type compound, with which a reaction is completed in a short time, an operation can be simplified, the reaction is easily controlled, and the cost of energy can be reduced.

Solution to Problem

The present invention has been completed as a result of intensive studies for achieving the above object, and provides a method for producing a conductive mayenite type compound, characterized by mixing a mayenite type compound with a carbon component, placing the resulting mixture in an airtight container, and irradiating the mixture with a microwave in an inert gas atmosphere or in a vacuum atmosphere to heat the mixture.

In the method for producing a conductive mayenite type compound according to the present invention, the mayenite type compound used as a raw material may be any as long as it is an oxide ion clathrate aluminosilicate. As the mayenite type compound, a mayenite type compound in which the molar ratio of calcium to aluminum is within a range of 11 to 13:12 to 16 is preferred.

The mayenite type compound (C12A7) may be a compound obtained by substituting some or all Ca atoms and/or Al atoms of the crystal skeleton with another atom within a range where a cage structure formed by a crystal lattice skeleton is maintained, or may be an isomorphic compound obtained by substituting some or all free oxygen ions in the cage structure with another anion. The mayenite type compound (C12A7) is sometimes denoted by $Ca_{12}Al_{14}O_{33}$ or $Ca_{24}Al_{28}O_{66}$.

The mayenite type compound (C12A7) is preferably a compound having a representative composition of $(Ca_{12}Al_{14}O_{33})$ and also having a crystal structure constituted by three-dimensionally connected voids (cages).

In the method for producing a conductive mayenite type compound according to the present invention, as the carbon component used as the other raw material, any material can be used as long as it is composed of a carbon atom, and examples thereof include silicon carbide, active carbon, graphite, carbon black, Ru/carbon, graphene, glassy carbon, and acetylene black.

In the method for producing a conductive mayenite type compound according to the present invention, the mixing ratio of the mayenite type compound to the carbon component is preferably 3 to 9:1 to 4, more preferably 4 to 7:1 to 4 in a weight ratio.

The airtight container used in the method for producing a conductive mayenite type compound according to the present invention is preferably a container made of quartz glass, for example, an ampoule tube. After the mixture of the mayenite type compound and the carbon component is placed in the airtight container, gas replacement or vacuuming of the inside of the container is performed, followed by sealing the container.

In the method for producing a conductive mayenite type compound according to the present invention, in order to make the mayenite type compound placed in the airtight container electrically conductive by reducing the compound while heating, the inside of the airtight container is made an inert gas atmosphere or a vacuum atmosphere. The oxygen concentration in the inert gas atmosphere is preferably 1 (v/v) % or less, more preferably 0.9 (v/v) % or less, most preferably 0.8 (v/v) % or less. The inert gas atmosphere in the airtight container may be nitrogen, argon, helium, or the like. The pressure in the vacuum atmosphere may be a pressure decreased to 10 torr or less, preferably a pressure decreased to 3 to 10 torr using, for example, a vacuum pump.

Figure 1:
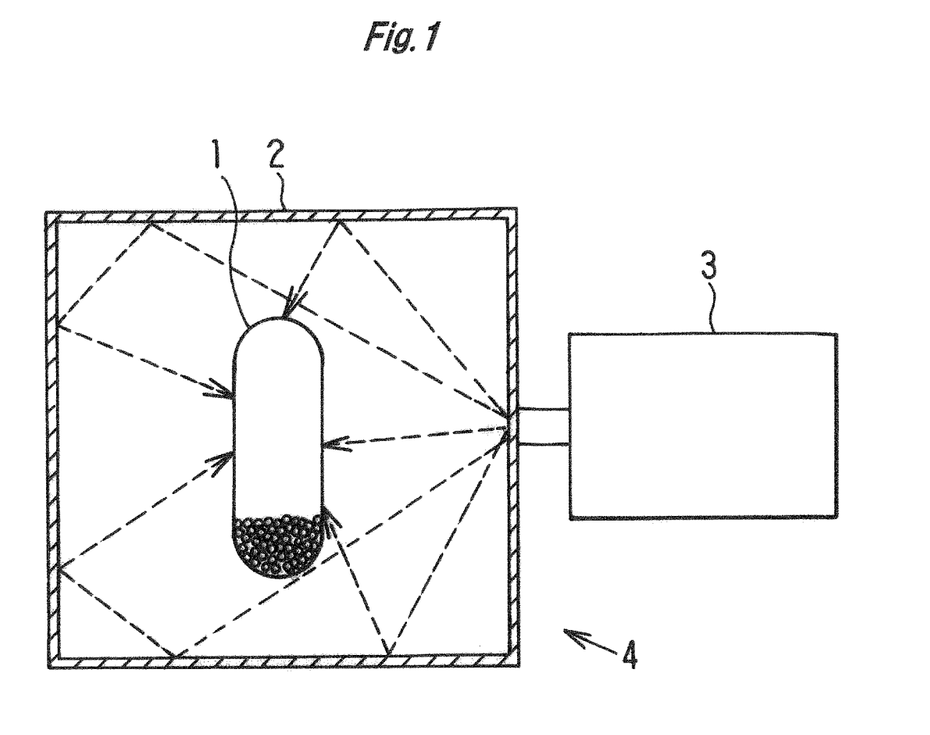
FIG. 1 is a vertical cross-sectional view of a microwave generator schematically showing a state of irradiation by the microwave generator.

The microwave is one of the radio waves classified according to frequency and refers to a wave in the shortest wavelength region (generally, an electromagnetic wave with a wavelength of 1 m to 100 μm and a frequency of 0.3 to 300 GHz) among the radio waves. In the oscillation of the microwave, a circuit or the like using a magnetron, a klystron, a traveling wave tube (TWT), a gyrotron, or a Gunn diode may be used. The irradiation with the microwave is performed using a microwave generator. A microwave generator which generates a microwave with a frequency of 910 MHz, 2.45 GHz, or 5.8 GHz, each of which is a frequency permitted for industrial heating in the Japanese Radio Act is easily available and is preferably used. For example, as shown in FIG. 1, an airtight container (1) in which the mixture is placed is disposed in a reaction vessel (2) in an airtight state, and the inside of the reaction vessel (2) is irradiated with a microwave by a semiconductor or magnetron generator (3). In this manner, the mixture is irradiated with the microwave by a microwave generator (4), and as a result, the mayenite type compound (C12A7) is heated, whereby electrical conductivity is imparted to the compound.

The heating conditions of the mixture by the irradiation with the microwave are preferably at 600 to 1200° C. for 5 to 60 minutes, and particularly preferably, heating is performed at an atmospheric temperature of 800 to 900° C. for a time period of 10 to 40 minutes, whereby the conductive mayenite type compound is produced.

The mechanism of imparting electrical conductivity to the mayenite type compound is considered such that when the mixture is irradiated with a microwave, the microwave is absorbed by the mixture, the energy thereof is converted into heat to heat the mixture, and the carbon component draws oxygen from the mayenite type compound to reduce the compound, whereby the conductive mayenite type compound is formed.

Advantageous Effects of the Invention

According to the method for producing a conductive mayenite type compound of the present invention, a conductive mayenite type compound is produced by mixing a mayenite type compound with a carbon component, placing the resulting mixture in an airtight container, and irradiating the mixture with a microwave in an inert gas atmosphere or in a vacuum atmosphere to heat the mixture. Therefore, a conductive mayenite type compound having favorable properties can be produced easily, stably, and at a low cost without requiring a high-temperature or long-time reaction and complicated reaction control.

In this manner, according to the method of the present invention, the reaction is completed in a short time, the operation can be simplified, the reaction is easily controlled, and the cost of energy can be reduced.

DESCRIPTION OF EMBODIMENTS

Next, Examples of the present invention will be described along with Comparative Examples, however, the present invention is not limited to these Examples.

A method for producing a mayenite type compound (C12A7) used in the present invention is not particularly limited. For example, in this Example, a mayenite type compound was produced by adding aluminum oxide to calcium oxide as described below.

Other than this, the same compound can be produced also by a production process including a step of producing katoite using an aluminum powder and calcium hydroxide as raw materials and a step of converting the katoite into a mayenite type compound.

<Method for Producing Mayenite Type Compound in this Example>

A powder of $CaCO_3$ (Kishida Chemical Co., Ltd., ≥99.5%) (4.00 g) and a powder of $\gamma$-$Al_2O_3$ (Alfa Aesar, ≥99.9%) (2.38 g) were weighed by an electronic balance and mixed well using a mortar. The mixed powder was transferred to an alumina crucible, and melted at 1300° C. for 12 hours in an air atmosphere using an electric furnace (Koyo Thermo Systems Co., Ltd., KBF314N), followed by natural cooling, whereby a mayenite type compound (C12A7) was produced.

Example 1 (Use of Glassy Carbon as Carbon Component and Irradiation with Microwave in Nitrogen Atmosphere)

The mayenite type compound (0.22 g) and glassy carbon (Aldrich Co., Ltd.) (0.035 g) were mixed, and the resulting mixture was placed in an ampoule tube (diameter: 2.5 cm, length: 15 cm). Subsequently, nitrogen gas replacement in the ampoule tube was performed so that the oxygen concentration in the tube was decreased to less than 1% (v/v), and the tube was sealed. Subsequently, this ampoule tube was disposed in a reaction vessel of a microwave generator, and by a magnetron of the microwave generator, the mixture in the ampoule tube was irradiated with a microwave with a frequency of 2.45 GHz at a temperature of 800 to 900° C. for 20 minutes.

Example 2 (Use of Glassy Carbon as Carbon Component and Irradiation with Microwave in Argon Atmosphere)

The same procedure as in Example 1 was performed except that argon gas replacement was performed in place of nitrogen gas replacement.

Example 3 (Use of Acetylene Black as Carbon Component and Irradiation with Microwave in Nitrogen Atmosphere)

The same procedure as in Example 1 was performed except that acetylene black (Strem Chemicals, Inc.) (0.029 g) was used in place of glassy carbon.

Example 4 (Use of Graphene as Carbon Component and Irradiation with Microwave in Nitrogen Atmosphere)

The same procedure as in Example 1 was performed except that graphene (Strem Chemicals, Inc.) (0.0251 g) was used in place of glassy carbon.

Example 5 (Use of Glassy Carbon as Carbon Component and Irradiation with Microwave in Vacuum Atmosphere)

The mayenite type compound (C12A7) (0.22 g) and glassy carbon (Aldrich Co., Ltd.) (0.035 g) were mixed, and the resulting mixture was placed in an ampoule tube (diameter: 2.5 cm, length: 15 cm). Subsequently, the ampoule tube was sealed, and then, the pressure in the tube was decreased to 10 to 3 torr using a vacuum pump. Subsequently, this ampoule tube was disposed in a reaction vessel of a microwave generator, and by a magnetron of the microwave generator, the mixture in the ampoule tube was irradiated with a microwave with a frequency of 2.45 GHz at a temperature of 800 to 900° C. for 20 minutes.

Comparative Example 1 (Conductive Mayenite of Prior Art)

A conductive mayenite type compound was prepared according to the method described in JP-A-2014-136661.

Comparative Example 2 (Use of Glassy Carbon as Carbon Component and Irradiation with Microwave in Air Atmosphere)

The same procedure as in Example 1 was performed except that the air atmosphere was left as it is without performing nitrogen replacement in the ampoule tube.

Comparative Example 3 (Use of Glassy Carbon as Carbon Component, in Air Atmosphere, and No Irradiation with Microwave)

The same procedure as in Example 1 was performed except that the air atmosphere was left as it is without performing nitrogen replacement in the ampoule tube, and irradiation with a microwave was not performed.

Analysis of Product (1) Raman Spectroscopy

With respect to the products obtained in the above-mentioned Examples and Comparative Examples, Raman spectroscopy was performed under the following conditions.

Analyzer: "NRS-3100" manufactured by JASCO Corporation (Analytical Conditions)
  excitation wavelength: 532 nm
  exposure time: 30 sec
  cumulative number: 2
  objective lens: 100×
  laser power: about 1 mW The measurement was performed at 5 points in each sample, and an average of the obtained measurements was calculated.

Figure 2:
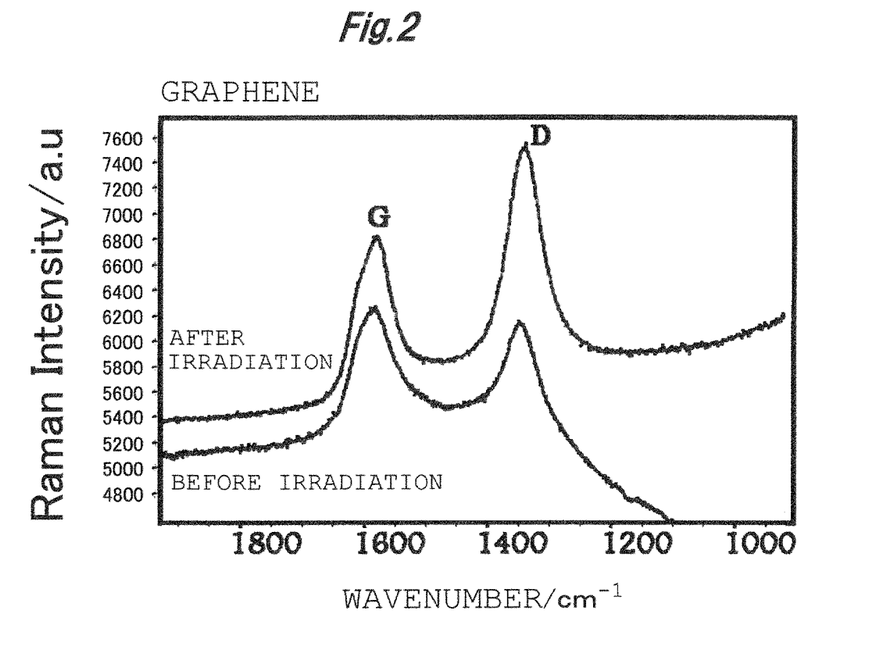
FIG. 2 shows Raman analysis spectra.

The Raman analysis spectra of graphene before and after irradiation with the microwave in Example 4 are shown in FIG. 2.

Figure 3:
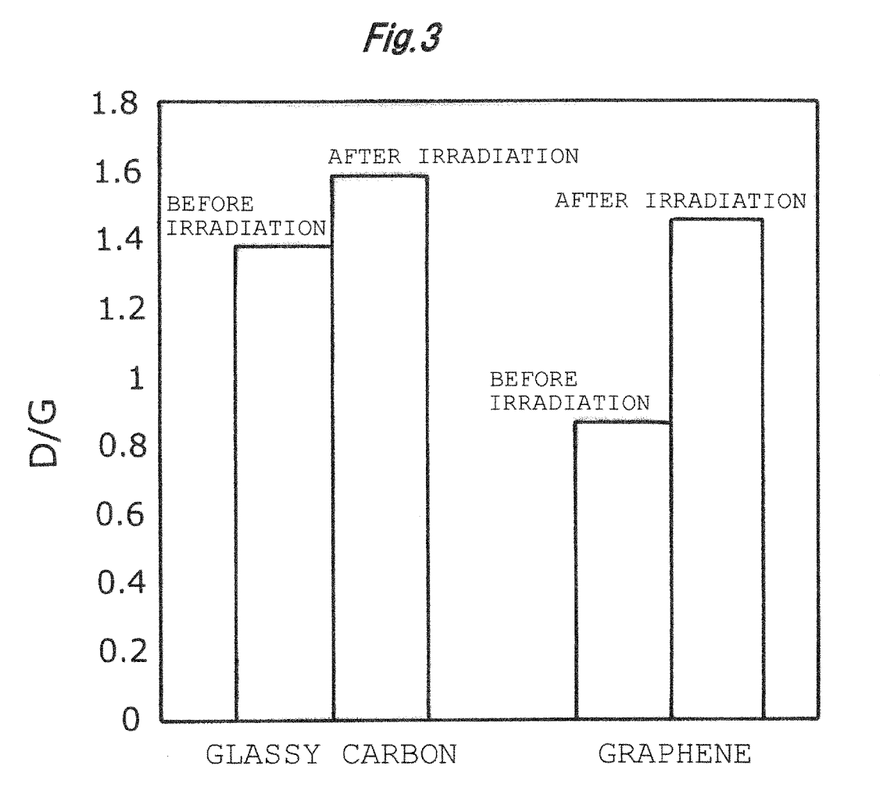
FIG. 3 is a graph showing the D/G values of the Raman analysis spectra.

The D/G values obtained from the Raman analysis spectra of the carbon component before and after irradiation with the microwave in Example 1 and Example 4 are shown in FIG. 3.

In FIG. 3, a higher D/G value indicates that carbon defects in the measurement sample increased.

From FIG. 3, it was confirmed that carbon in the sample irradiated with the microwave in Example 1 (using glassy carbon) and Example 4 (using graphene) has a high D/G value, and therefore, crystal defects increased, and the mayenite type compound was partially reduced.

(2) Electron Spin Resonance (ESR) Analysis

With respect to the products obtained in the above-mentioned Examples and Comparative Examples, an electron spin resonance analysis was performed under the following conditions. The ESR analysis is a method used for detection of an unpaired electron.

Analyzer: "JES-RE3X (JES-PX1000)" manufactured by JEOL Ltd.
(Analytical Conditions)
  measurement temperature: room temperature
  microwave frequency: 9.2 GHz
  microwave power: 1 mW
  magnetic field modulation width: 0.1 mT
  standard reference material: $Mn^{2+}/MnO_2$ The electron spin resonance analysis results for the samples of the products obtained in Examples 1 to 4 and Comparative Examples 1 to 3 are shown in FIG. 4 and FIG. 5.

Figure 4:
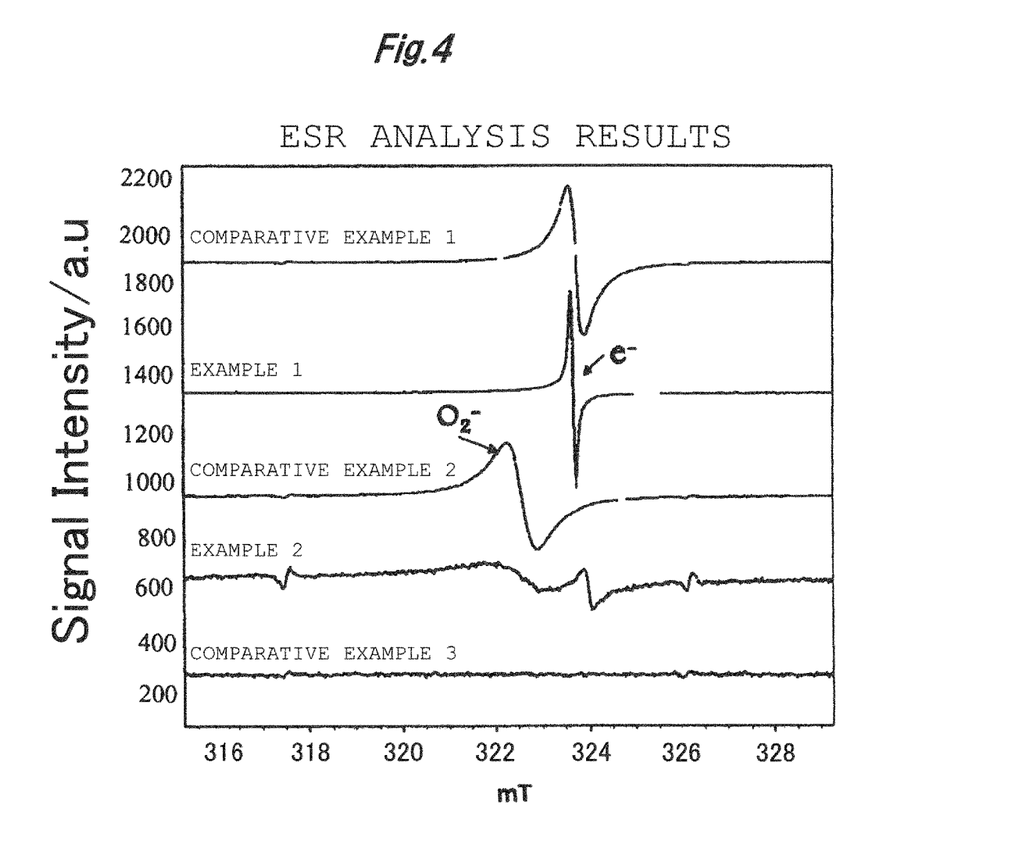
FIG. 4 shows ESR analysis spectra.
Figure 5:
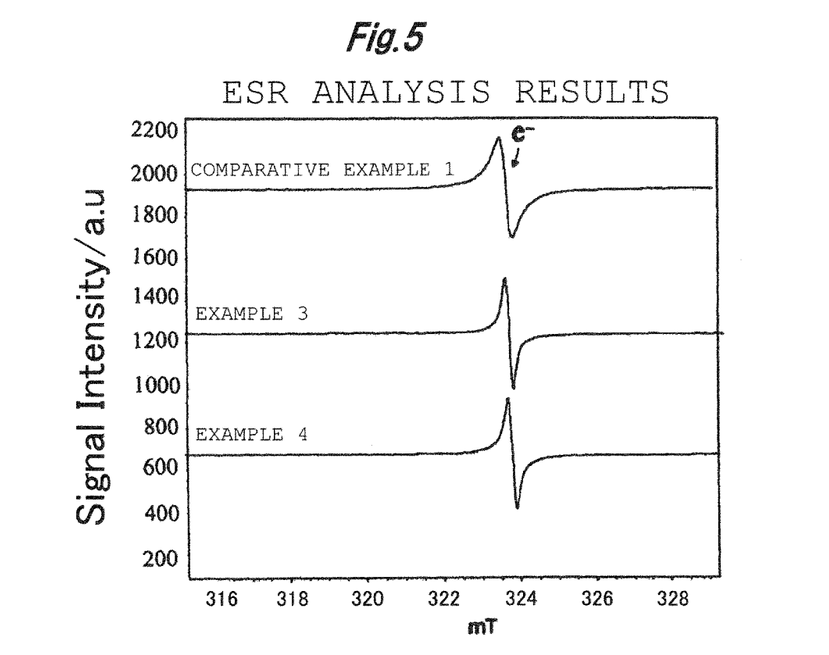
FIG. 5 shows ESR analysis spectra.

As shown in FIG. 4 and FIG. 5, in the products of Examples 1 to 4 irradiated with the microwave, a peak at around 324 mT is attributed to e− as compared with the product of Comparative Example 3 without irradiation with a microwave, and it is found that the products of Examples 1 to 4 and Comparative Example 1 are each a conductive mayenite type compound. In the product of Comparative Example 2 (in the air atmosphere), a peak of $O^{2-}$ is detected at around 322 mT, and it is found that a conductive mayenite type compound is not formed.

(3) X-Ray Diffraction (XRD) Analysis

With respect to the products obtained in the above-mentioned Examples and Comparative Examples, an X-ray diffraction (XRD) analysis was performed under the following conditions.

X-ray diffractometer: "RINT 2500HF+/PC-FA" manufactured by Rigaku Corporation (Analytical Conditions)
  Cu/40 kV/40 mA
  scan speed: 10°/min
  scanning range: 10 to 70.0°

Figure 6:
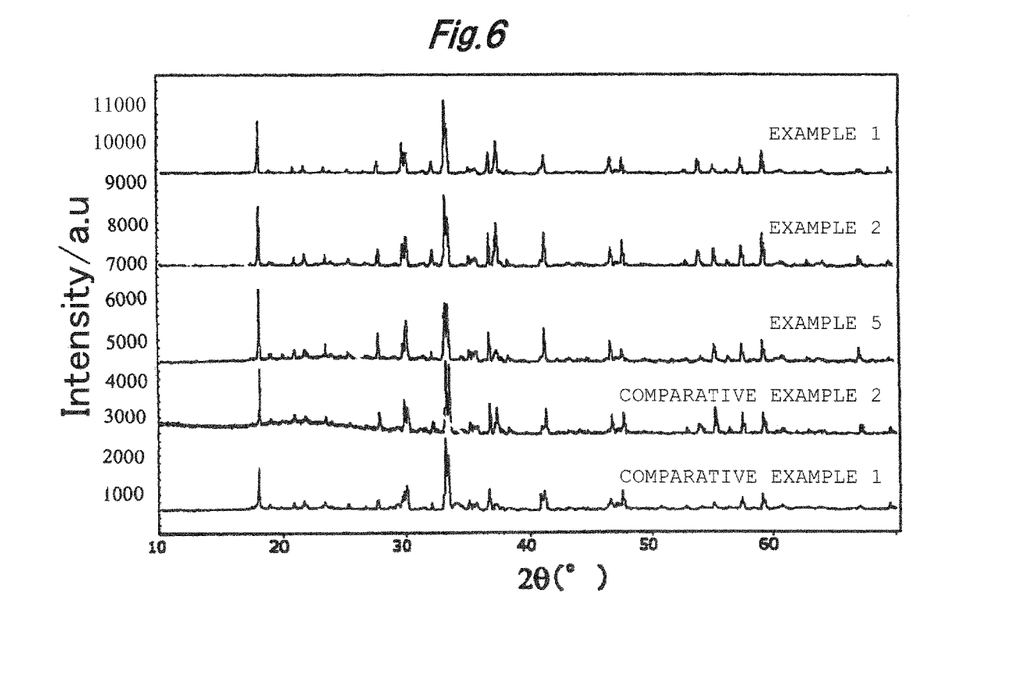
FIG. 6 is a view showing XRD analysis results.

The X-ray diffraction analysis results for the samples of the products obtained in Examples 1, 2, and 5 and Comparative Examples 1 and 2 are shown in FIG. 6.

From these X-ray diffraction analysis results, it was confirmed that the products obtained in the above-mentioned Examples maintain a mayenite type compound structure.

Incidentally, it is known that by calcining a raw material of a mayenite type compound at about 500° C. or higher, the raw material is converted into the mayenite type compound. Therefore, in the present invention, by irradiating a raw material of a mayenite type compound with a microwave to heat the raw material, the raw material is converted into the mayenite type compound, and therefore, the mayenite type compound utilized in the present invention may be, for example, katoite which is a precursor of the mayenite type compound, or may be aluminum oxide and calcium oxide, or aluminum oxide and calcium hydroxide.

The invention claimed is:

1. A method for producing a conductive mayenite, characterized by mixing a mayenite ($Ca_{12}Al_{14}O_{33}$) with a carbon component, placing the resulting mixture in an airtight container, and irradiating the mixture with a microwave in an inert gas atmosphere or in a vacuum atmosphere to heat the mixture.

2. The method for producing a conductive mayenite according to claim 1, characterized in that the mayenite ($Ca_{12}Al_{14}O_{33}$) has a crystal structure constituted by three-dimensionally connected cages.

3. The method for producing a conductive mayenite according to claim 1, characterized in that the carbon component is at least one selected from the group consisting of silicon carbide, active carbon, graphite, carbon black, Ru/carbon, and graphene.

4. The method for producing a conductive mayenite according to claim 1, characterized in that the airtight container is made of quartz glass.

5. The method for producing a conductive mayenite according to claim 1, characterized in that the heating conditions of the mixture by the irradiation with the microwave are at 600 to 1200° C. for 5 to 60 minutes.

6. The method for producing a conductive mayenite according to claim 2, characterized in that the carbon component is at least one selected from the group consisting of silicon carbide, active carbon, graphite, carbon black, Ru/carbon, and graphene.

7. The method for producing a conductive mayenite according to claim 2, characterized in that the airtight container is made of quartz glass.

8. The method for producing a conductive mayenite according to claim 3, characterized in that the airtight container is made of quartz glass.

9. The method for producing a conductive mayenite according to claim 6, characterized in that the airtight container is made of quartz glass.

10. The method for producing a conductive mayenite according to claim 2, characterized in that the heating conditions of the mixture by the irradiation with the microwave are at 600 to 1200° C. for 5 to 60 minutes.

11. The method for producing a conductive mayenite according to claim 3, characterized in that the heating conditions of the mixture by the irradiation with the microwave are at 600 to 1200° C. for 5 to 60 minutes.

12. The method for producing a conductive mayenite according to claim 4, characterized in that the heating conditions of the mixture by the irradiation with the microwave are at 600 to 1200° C. for 5 to 60 minutes.

13. The method for producing a conductive mayenite according to claim 6, characterized in that the heating conditions of the mixture by the irradiation with the microwave are at 600 to 1200° C. for 5 to 60 minutes.

14. The method for producing a conductive mayenite according to claim 7, characterized in that the heating conditions of the mixture by the irradiation with the microwave are at 600 to 1200° C. for 5 to 60 minutes.

15. The method for producing a conductive mayenite according to claim 8, characterized in that the heating conditions of the mixture by the irradiation with the microwave are at 600 to 1200° C. for 5 to 60 minutes.

16. The method for producing a conductive mayenite type compound according to claim 9, characterized in that the heating conditions of the mixture by the irradiation with the microwave are at 600 to 1200° C. for 5 to 60 minutes.

\* \* \* \* \*